(12) United States Patent
Macchetti

(10) Patent No.: US 8,494,160 B2
(45) Date of Patent: Jul. 23, 2013

(54) METHOD AND APPARATUS FOR DECRYPTING ENCRYPTED CONTENT

(75) Inventor: Marco Macchetti, Casnate con Bernate (IT)

(73) Assignee: Nagravision S.A., Cheseaux-sur-Lausanne (CH)

( * ) Notice: Subject to any disclaimer, the term of this patent is extended or adjusted under 35 U.S.C. 154(b) by 39 days.

(21) Appl. No.: 13/067,258

(22) Filed: May 19, 2011

(65) Prior Publication Data

US 2011/0293091 A1 Dec. 1, 2011

Related U.S. Application Data

(60) Provisional application No. 61/367,473, filed on Jul. 26, 2010.

(30) Foreign Application Priority Data

Jun. 1, 2010 (EP) ..................................... 10164562

(51) Int. Cl.
*H04L 29/06* (2006.01)

(52) U.S. Cl.
USPC .......................................... 380/210; 380/239

(58) Field of Classification Search
USPC ................................. 380/210, 239
See application file for complete search history.

(56) References Cited

U.S. PATENT DOCUMENTS

2002/0133701 A1 9/2002 Lotspiech et al.
2009/0323949 A1* 12/2009 Chieze et al. ................. 380/239

FOREIGN PATENT DOCUMENTS

| EP | 1703731 A1 | 9/2006 |
|----|---|---|
| EP | 2141924 A1 | 1/2010 |
| EP | 2192773 A1 | 6/2010 |
| WO | WO-2006040482 A2 | 4/2006 |
| WO | WO-2007116390 A2 | 10/2007 |
| WO | WO-2008023023 A1 | 2/2008 |

OTHER PUBLICATIONS

Francis et al., "Countermeasures for attacks on satellite TV cards using open receivers", Nov. 6, 2004, pp. 1-6, XP002333719.
Boneh D. et al., "An Efficient Public Key Traitor Tracing Scheme", Aug. 15, 1999, pp. 338-353, XP001194953.
Jiang T. et al., "Secure Communication Between Set-Top Box and Smart Card in DTV Broadcasting", Aug. 1, 2004, pp. 882-886, XP001225096.
European Search Report for Application No. EP 10164592.0 filed Jun. 1, 2010.

* cited by examiner

*Primary Examiner* — Brandon Hoffman
*Assistant Examiner* — Michael D Anderson
(74) *Attorney, Agent, or Firm* — Harness, Dickey & Pierce, P.L.C.

(57) ABSTRACT

The present invention provides a method for decrypting encrypted content transmitted from an operator to a plurality of users where said operator further provides security information allowing for the decryption of said content. The method has the advantage of satisfying the goal of providing the capability for detecting a fraudulent user who retransmits control words extracted from the security information to other users. The method provides for the achievement of the goal without incurring extra overhead in addition to the transmitted content and security information. The method makes use of control words which are based on multiple solutions provided by collisions in mathematical functions and involves the observation of choices of control words retransmitted by the fraudulent user.

10 Claims, 1 Drawing Sheet

METHOD AND APPARATUS FOR DECRYPTING ENCRYPTED CONTENT

CROSS REFERENCE TO RELATED APPLICATIONS

This application claims priority under 35 U.S.C. Section. 119 to EP Application No. EP 10164562.0 entitled "A method and apparatus for decrypting encrypted content" filed Jun. 1, 2010, and under 35 U.S.C. Section. 119 (e) to US Provisional Application No. 61/367,473 filed on Jul. 26, 2010 entitled "A method and apparatus for decrypting encrypted content", the entire contents of each of which are hereby incorporated herein by reference.

INTRODUCTION

The present invention relates to the domain of conditional access systems and more particularly to methods for uncovering the identity of an apparatus used in the practice of unauthorised redistribution of secret encryption keys.

STATE OF THE ART

One area in which the present invention may be of particular interest is in the domain of pay-TV, where broadcast proprietary audio/video content is offered by an operator at a fee to a plurality of subscribing consumers. Conditional access systems are employed to handle the processing of pay-TV content, with a view to ensuring that only consumers who have subscribed to certain services, usually by payment of a fee to the operator or provider of those services, actually have access to the content provided for those services. According to such conditional access systems, the content is encrypted by the operator under control words, the latter being supplied to the subscribing consumers via security messages, which are either broadcast in a data stream along with the content or may be distributed by some other means. Each subscribing consumer is supplied with an appropriate receiver comprising a security module to allow for the extraction of the control words from the security messages and a descrambling unit for decrypting the broadcast encrypted audio/video content.

Encrypted audio/video content has value and as such, conditional access systems have been the target for attack by malicious third parties intent on gaining access to the audio/video content without subscribing to the services of the operator and without being in possession of the necessary authorised reception equipment. A practice commonly known as control word sharing, whereby the control words broadcast along with encrypted content are extracted by a malicious third party using valid security modules and redistributed freely to other malicious third parties, is a particularly significant threat to operators offering pay-TV services since it deprives them of revenue from which they would otherwise have benefited.

Pay-TV operators therefore have a great interest in being able to trace receiver units which are used in control word sharing activities as this allows the operator to take action against those involved in such activities. United States Patent Application Publication No. 2002/0,133,701A describes a method for tracing traitor receivers in a broadcast encryption system. The method includes using a false key to encode plural subsets representing receivers in the system. The subsets are derived from a tree using a Subset-Cover system, and the traitor receiver is associated with one or more compromised keys that have been obtained by a potentially cloned pirate receiver. Using a clone of the pirate receiver, the identity of the traitor receiver is determined. This system however has the disadvantage that multiple encodings of the same content have to be broadcast, thus having a negative impact on broadcast bandwidth efficiency.

BRIEF SUMMARY OF THE INVENTION

As described above, in order to fight against control word sharing activities, there is a need to provide a traitor tracing method which is simple to implement and which does not have a negative impact on broadcast bandwidth. With this aim in mind, the present invention provides a method for decrypting encrypted audio/video content in a decoder comprising at least a descrambler and a security module, said decryption being carried out by the descrambler using a final control word, said method comprising the steps of:

receiving, by the security module, at least two control words from either of which the final control word is derivable;

receiving, by the descrambler, the encrypted audio/video content;

selecting, by the security module, one of the at least two control words;

transferring the selected control word to the descrambler;

converting, by the descrambler, the selected control word to the final control word using at least a first cryptographic function, said cryptographic function yielding the same final control word for at least two different control words;

using the final control word to decrypt the encrypted audio/video content.

By creating a relationship between a sequence of selected control words from a sequence of control word pairs on one hand and a datum which uniquely identifies a security module on the other hand, the method provides the capability of identifying a security module used in control word sharing activity. Thinking that the control words received were final control words, a malicious user intent on performing control word sharing activity would redistribute the selected control words rather than the final control words. The result, on one hand, is that other malicious users who receive the shared control words would not be able to decrypt the encrypted content and, on the other hand, the malicious user, instigator of the control word sharing activity, would lay himself open to discovery of his identity by the operator who observes the redistributed control words. The invention thus provides an efficient and easily realisable solution to the problem of traitor tracing where a so-called traitor partakes in a control word sharing scheme.

BRIEF DESCRIPTION OF THE DRAWINGS

The present invention will be better understood thanks to the detailed description which follows and the accompanying drawings, which are given as non-limiting examples of embodiments of the invention, where.

DETAILED DESCRIPTION

The method employed by the present invention makes use of the phenomenon of collisions in certain types of mathematical functions and takes advantage of the differing levels of complexity associated with finding such collisions. For example, for a given first operand (CW1), it is possible to find a cryptographic function (H), which will yield a result (CW). It is further possible to find a second operand (CW2), different from the first operand (CW1), upon which the application of the same cryptographic function (H) will yield the same result (CW). In other words it is possible to find a collision where two different operands (CW1, CW2) subjected to a cryptographic function (H) yield the same result (CW). In the case where the cryptographic function (H) is a 64-bit hash function, it would take approximately $2^{32}$ operations to find such a collision, which is practically feasible using currently available technology. However, to find a further collision, whereby a third operand (CW3) yields the same result (CW) when subjected to the cryptographic function (H), would require approximately $2^{64}$ operations, which is technically unfeasible using currently available technology.

In a standard conditional access system where an operator wishes to broadcast audio/video content in a secure manner from a head-end to a plurality of decoders, he would encrypt the content under control words at the head-end and broadcast the encrypted content. He would also encrypt the control words under a transport key and include the results in security messages also to be broadcast from the head-end. As is well known in the pay-TV industry, encrypted content (AVE) and security messages (ECM) are usually broadcast in one data stream (DS) and filtered by the decoder for further processing by the various modules in the decoder. The decoders would have security modules with access to the transport key or an equivalent key and therefore would be able to extract the control words received in the broadcast security messages. Furthermore, according to well known principles in the pay-TV industry, before being allowed to decrypt an ECM a check is made to verify that the security module actually has the necessary rights to be able to decrypt the content. These rights are usually obtained upon payment of a fee and the rights are loaded into the security module via another type of security message known as Entitlement Management Messages (EMM), which can be received either on the broadcast channel along with the content or via another channel. This second type of security message is addressable to one or a group of security modules. We can see then that the broadcast of conditional access content is done therefore in three parts: the encryption of content under control words, the encryption of the control words to form ECMs—decryptable by security modules having the necessary rights and thirdly the granting of rights and handling of such rights using addressable EMMs.

Figure 1:
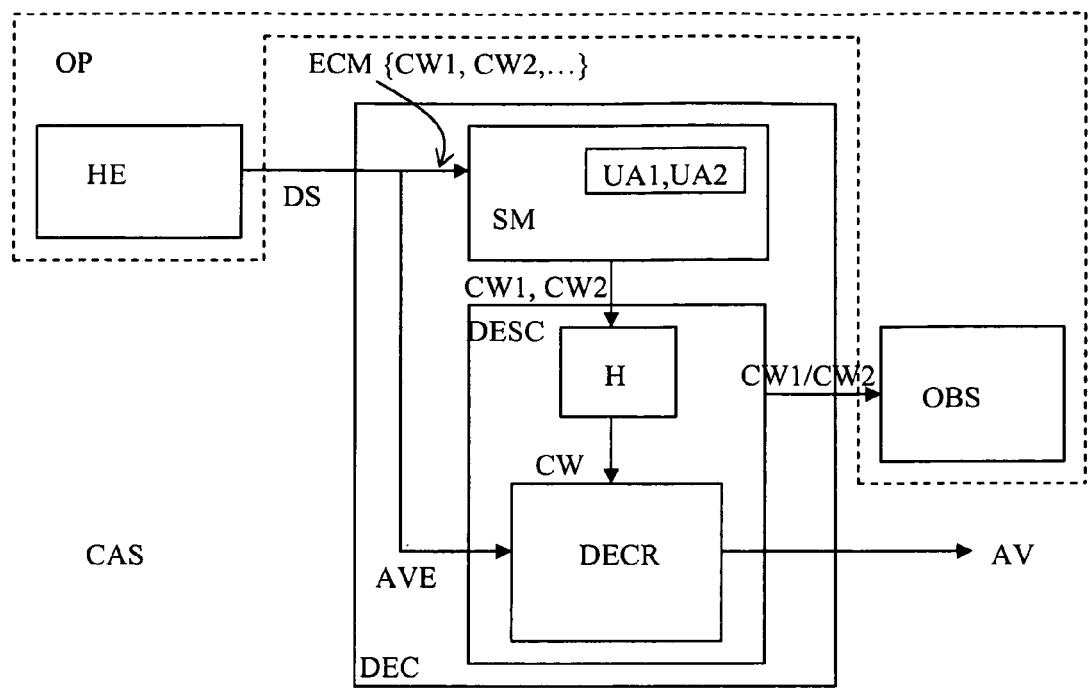
FIG. 1 shows a block diagram illustrating a conditional access system (CAS), in which an embodiment of the present invention may be deployed.

On the other hand, according to an embodiment of the present invention, the collision phenomenon described above is exploited in a conditional access system (CAS) in which an operator (OP) broadcasts from a head-end (HE) to at least one decoder (DEC). In this case, the content (AV) has been encrypted (AVE) at the head-end (HE) under at least one final control word (CW) or a key (KE) which is derivable from the final control word (CW). Instead of including the final control word (CW) in the security messages (ECM) to be broadcast with the encrypted content (AVE), the security messages (ECM) each comprise at least a first and a second control word (CW1, CW2). Each of the control words (CW1, CW2) in the security message (ECM) represent a collision for a given cryptographic function (H) in that the cryptographic function (H) of either of the first or second control words (CW1, CW2) yields the same single final control word (CW). The decoder (DEC) has access to a security module (SM) and a descrambler (DESC) as shown in FIG. 1. The decoder (DEC) receives encrypted content (AVE) and at least one security message (ECM) from the head-end (HE). The security module (SM) extracts and selects one from the first or second control words (CW1, CW2) and transfers it to the descrambler (DESC) to be converted to the final control word (CW) using the cryptographic function (H). The descrambler (DESC) then decrypts the encrypted content (AVE) in a decryption module (DECR) using the final control word (CW) or a key (KE) which it derives from the final control word (CW). In one particular embodiment of the invention the cryptographic function (H) which is used is a 64-bit one-way or hash function.

In a control word sharing attack, a malicious user of a valid security module (SM) retransmits final control words (CW) which have been successfully decoded from security messages (ECM) received by the valid security module (SM), to any number of users having non-authorised decoding equipment (i.e. descramblers without security modules or descramblers with non-valid security modules) thereby allowing those non-authorised users to decrypt encrypted content from the head-end by directly using the final control words (CW) supplied by the malicious user. One of the mediums available for such retransmission is the internet and so it is easy to see why such activity is a serious threat to operators of valuable broadcast content. The traceability feature afforded by the present invention follows from the way in which the security module is instructed to select between the two control words (CW1, CW2) and from the fact that the operator (OP) also listens for control words (CW) being shared by a malicious user.

In a standard conditional access system (CAS) the equivalent of the final control word (CW) described above is passed from the security module to the descrambler (DESC). In a conditional access system (CAS) in which an embodiment of the present invention is deployed, the malicious user will mistake the control word (CW1, CW2) from the security module (SM) for the final control word (CW) and wrongly distribute the control word (CW1, CW2). This has two effects: on one hand it prevents other malicious users who receive the control words from accessing the encrypted content (AVE) since the encrypted content is encrypted under the final control words (CW) and on the other hand, if the choice of control words (CW1, CW2) can be related to a parameter which can uniquely identify a security module (SM), then the malicious user lays himself open to discovery by an operator who observes a series of shared control words (CW1, CW2). This is further explained below.

Each security module (SM) in a collection of security modules (SM) managed by the operator (OP) is uniquely identifiable by an internal setting (UA) which is particular to the security module (SM). Each security module (SM) is instructed to select one of the control words (CW) according to its unique internal setting (UA). The internal setting (UA) could be for example the value of a register representing the security module's unique address. Preferably, the security module (SM) is instructed to select the control word (CW) according to the value of the nth bit of its unique address for example.

In an embodiment where the control words are not grouped in pairs as mentioned above, but in groups of say 16 or 32 control words, one of which should be selected according to an internal setting, then instead of using just one bit of the internal setting (UA) for the selection, a block of bits can be used to make the selection. For example, in the case of a unique address of 32 bits we could split the 32 bits onto 8 blocks of 4 bits and perform a mathematical operation on the 4 bits and use the result to indicate the selection. Then we move to the next block and do the same again and so on.

According to an embodiment of the present invention, a series of pairs of first and second control words (CW1$a$, CW2$a$, CW1$b$, CW2$b$, CW1$n$, CW2$n$) are received by the security module (SM) and, for each control word pair (CW1, CW2) in the series (CW1$a$, CW2$a$, CW1$b$, CW2$b$, CW1$n$, CW2$n$), the security module (SM) is instructed to select one from the pair (CW1, CW2) according to the value of a particular bit in its unique address. For example, the selection from the first pair of control words (CW1$a$, CW2$a$) is made according to the value of the first bit of the security module's (SM) unique address while the selection from the second pair of control words (CW1$a$, CW2$a$) is made according to the value of the second bit of its unique address and so on. The result is that each security module (SM) will select a series of control words from the control word pairs (CW1$a$, CW2$a$, CW1$b$, CW2$b$, CW1$n$, CW2$n$) according to the value of its unique address, i.e. in a unique way. By inspecting the series of control words used by a security module (SM) or, more exactly, redistributed by a malicious user of a security module (SM), it is therefore possible for the operator (OP) to deduce the security module's unique address, since the operator (OP) keeps track of all the pairs of control words sent (CW1$a$, CW2$a$, CW1$b$, CW2$b$, CW1$n$, CW2$n$). By eavesdropping (OBS) in order to pick up control words which the user of a security module (SM) may transmit to other users, the operator (OP) can detect which decoder (DEC), or at least which security module (SM), is transmitting the control words (CW) and take appropriate action against the user of that decoder (DEC). The present invention therefore provides a simple method for detecting a security module (SM) which is used in a control word sharing scheme by simply observing (OBS) retransmitted control words (CW) over time. The method has almost no negative effect on broadcast bandwidth since no significant transmission overhead is needed over and above the normal broadcast transmission requirements. The method serves both to identify the apparatus at the root of the malicious use and to prevent other users from having access to encrypted content using the redistributed control words since the content is encrypted using final control words (CW) and not using control words (CW1, CW2).

As was previously mentioned, it could take approximately $2^{32}$ operations to find a collision in the case that the function (H) is a 64-bit hash function. In other words, for a given first control word (CW1) leading to a given final control word (CW) via the function (H), it would take up to $2^{32}$ operations to find a second control word (CW2) which would lead to the same final control word (CW). This is technically feasible using currently available technology. However, to find a further collision, i.e. a third control word (CW3) which would result in the same final control word (CW) using the same function (H), would take $2^{64}$ operations, which becomes technically unfeasible. This means that it is easy for the operator (OP) to find a pair of control words (CW1, CW2) which will give the same final control word (CW) when subjected to the function (H) but technically unfeasible for a malicious third party to discover a third control word (CW3) which would give the same final control word (CW) when subjected to the function (H). By successively retransmitting, as part of a control word sharing scheme, one of the two control words (CW1, CW2) received in a broadcast, the identity of a malicious third party is liable to be compromised if the operator (OP) simply observes (OBS) the series of control words (CW1, CW2) being shared.

The mechanism described above for selecting which of the two control words in a pair (CW1, CW2) is to be used by the security module (SM) can be overridden i.e. enabled/disabled. To override for example the head-end would send the security message (ECM) comprising the two control words (CW1, CW2) as before and also include an instruction to disable the selection based on the internal setting. The ECM could include an instruction as to which control word to select, thus overriding the system of selection by internal setting. In another embodiment, a separate security message or management message (EMM) may be used to give the disable/enable instruction or to give the instruction indicating which of two control words received in a previous security message or in a future security message should be used. In yet another embodiment of the present invention, the instructions may come in an indirect way. For example the security message (ECM), or a management message (EMM) may further comprise time information such as time of day for example. The instruction as to which control word to use may be the result of some intermediate calculations which use the time information in the security message (ECM) or in the management message (EMM) or a derivative thereof. Furthermore, any of such messages described above could be used to give instructions indicate to the security module that it should use some other internal setting, such as a credit value for example, as selection criteria. It is also possible for instructing the security module to perform mathematical manipulations on any of the internal setting to derive in a more indirect way the selection parameter.

In a particular embodiment of the present invention, an initialised sweep counter (CNTR) is used to point to a particular bit in the unique address of the security modules. When initialised, the sweep counter points to the first bit of the unique address and the state of that bit is used to select one from the first pair of control words received. When the selection has been made the sweep counter increments and the next bit of the unique address is used to select one from the next pair of control words received. This process is continued until all of the bits of the unique address have been used, whereupon the sweep counter is reinitialised. The control words from the security messages may be processed as and when they arrive or they may be stored in a control word table (CWT) and processed on demand or according to a time-based regime.

According to another embodiment of the present invention, rather than the command driven processing described above, a more automated method may be used. In this embodiment the security message (ECM) or the management message (EMM) further comprises information related to time—time of day for example. This information may be used to further indicate at what time the selection of the control word should be made. Furthermore, a hash function performed on the time-related information yields a value which may be used to point to a particular bit of the unique address to use in selecting one from the pair of control words. For example, for a 32-bit unique address, a modulo-32 of the result of the hash of the time-related information would point to one of the 32 bits from the unique address.

Figure 2:
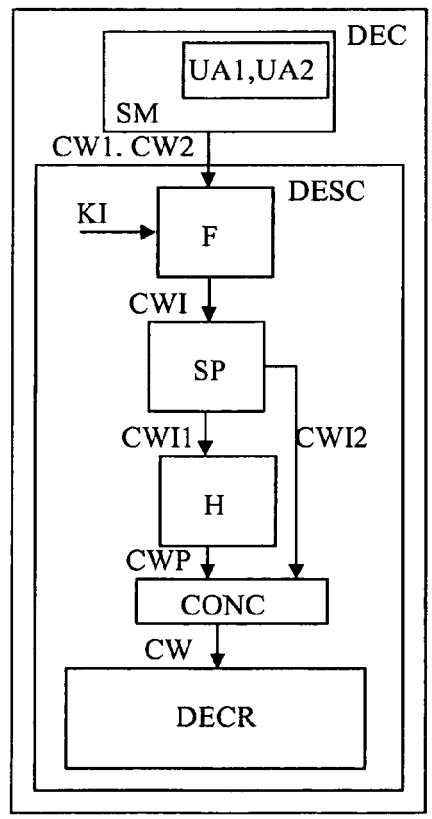
FIG. 2 shows a block diagram of a decoder (DEC) in which another embodiment of the present invention may be deployed.

FIG. 2 shows a schematic diagram of another embodiment of a decoder (DEC) in which an embodiment of the present invention may be deployed. In this embodiment, a further layer of encryption is added. The goal here is to offer further possibilities for adding complexity to a proprietary cryptographic algorithm used in implementing the present invention, thus further obfuscating the final control word should a malicious user gain access to the control word table (CWT). In this embodiment, a second cryptographic function (F) is first applied to the selected control word (CW1, CW2) using an intermediate encryption key (KI). It is worth noting that the intermediate key (KI) used in the second cryptographic function (F) may be hard-wired within the descrambler (DESC), the descrambler being preferably a proprietary descrambler. This second cryptographic function (F) yields an intermediate control word (CWI) which is then split into a first part (CWI1) and a second part (CWI2). The first part (CWI1) is then subjected to the first cryptographic function (H) to give a partial control word (CWP). The partial control word is then concatenated (CONC) or in some way combined with the second part (CWI2) to give the final control word (CW). It is to be noted that during the splitting of the intermediate control word (CWI), attention is paid to the fact that a first part (CWI1) obtained from either of the two control words (CW1, CW2) needs to yield the same partial control word (CWP) when subjected to the first cryptographic function (H). Similarly, the final control word (CW) resulting from the combination of the partial control word (CWP) and the second part (CWI2) will be the same regardless of which of the two control words (CW1, CW2) were selected.

According to an embodiment of the invention, the second cryptographic function (F) is preferably a symmetric encryption function such as is generally known in the cryptographic domain, such as the Data Encryption Standard (DES) block cipher algorithm or the Advanced Encryption Standard (AES) for example.

The invention claimed is:

1. A method for decrypting encrypted audio/video content in a decoder comprising at least a descrambler and a security module, said decryption being carried out by the descrambler using at least one final control word, said method comprising:
   receiving, by the descrambler, the encrypted audio/video content;
   converting, by the descrambler, one of at least two different control words to a first final control word using at least a first cryptographic function, the one of the at least two different control words being transferred to the descrambler upon being selected by the security module based on at least a first of an internal setting allowing the security module to be uniquely identified, said cryptographic function yielding the first final control word for either of the at least two different control words;
   using, by the descrambler, the first final control word to decrypt at least a first part the encrypted audio/video content;
   converting, by the descrambler, a further control word of a further set of at least two different control words to a further final control word using at least the first cryptographic function, the further control word being transferred to the descrambler upon being selected by the security module based on at least a second part of the internal setting, the second part of the internal setting being different from the first part of the internal setting, said first cryptographic function yielding the further final control word for either of the two different control words of the further set of at least two different control words; and
   using, by the descrambler, the further final control word to decrypt at least a further part of the encrypted audio/video content.

2. The method according to claim 1, further comprising:
   receiving, by the security module, a management message comprising a command to enable/disable the selection of one of the at least two different control words.

3. The method according to claim 1, further comprising:
   receiving, by the security module, a management message comprising a command to force the selection of one of the at least two different control words.

4. The method according to claim 2, wherein the management message further comprises an indication of a time at which the command is to be executed.

5. The method according to claim 3, wherein the management message further comprises an indication of a time at which the command is to be executed.

6. The method according to claim 1, wherein the conversion step further comprises:
   converting the selected control word to an intermediate control word by a second cryptographic function under an intermediate key;
   dividing the intermediate control word into a first part and a second part;
   applying the first cryptographic function to the first part to obtain a partial control word, the partial control word being identical for the first part obtained from either of the at least two different control words;
   concatenating the partial control word with the second part to form the final control word.

7. The method according to claim 1, wherein the first cryptographic function is a one-way function.

8. A method for identifying a security module, said security module being uniquely identifiable by at least one internal setting, said method comprising:
   sending at least two different control words from an operator to the security module;
   receiving, by the operator, at least one of the two different control words;
   determining at least a first part of the at least one internal setting by the operator, said determination based on a correspondence of the received control word with one of the sent control words;
   sending at least one further set of at least two different controls words from the operator to the security module;
   receiving, by the operator, at least one of the further set of at least two different control words;
   determining at least a second internal setting by the operator, said determination being based on a correspondence of the received control word with one of the further sent control words;
   reconstructing the internal setting by the operator, said reconstruction being based at least on the determined first part and the determined further part of the internal setting; and
   using the reconstructed parameter to identify the security module.

9. A decoder device for decrypting encrypted audio/video content, said decoder device comprising a descrambler and a security module, said security module having an internal setting and being configured to:
   receive at least a first set of at least two different control words;
   select one of the at least two different control words, said selection being made based on at least a first part of the internal setting; and
   pass the selected control word on to the descrambler;
   receive a further set of at least two different control words;
   select one of the further set of at least two different control words, said selection being based on at least a second part of the internal setting; and
   pass the further selected control word on to the descrambler,
   said descrambler comprising at least a decryption module to decrypt the encrypted audio/video content, the descrambler further comprising a first encryption module configured to perform at least a first cryptographic function and wherein:

said first encryption module being configured to convert the selected control word to a first final control word and the further selected control word to a further final control word, said cryptographic function yielding an identical final control word for either of the first set of at least two different control words and an identical further final control word for either of the further set of at least two different control words;

said descrambler being configured to decrypt at least part of the encrypted audio/video content using the final control word and at least a further part of the encrypted audio/video content using the further final control word.

10. The decoder device according to claim 9, wherein said descrambler further comprises:

a second encryption module configured to perform a second cryptographic function, said second encryption module being configured to convert the selected control word to an intermediate control word under an intermediate key;

a splitter to split the intermediate control word into a first part and a second part;

wherein said first encryption module converts the first part to a partial control word, the partial control word being identical for a first part obtained from either of the at least two different control words and wherein said descrambler further comprises a concatenator configured to concatenate the partial control word with the second part to form the final control word.

* * * * *